Sept. 12, 1939.　　　J. A. WHITE　　　2,172,824
FISHING REEL
Filed March 20, 1939
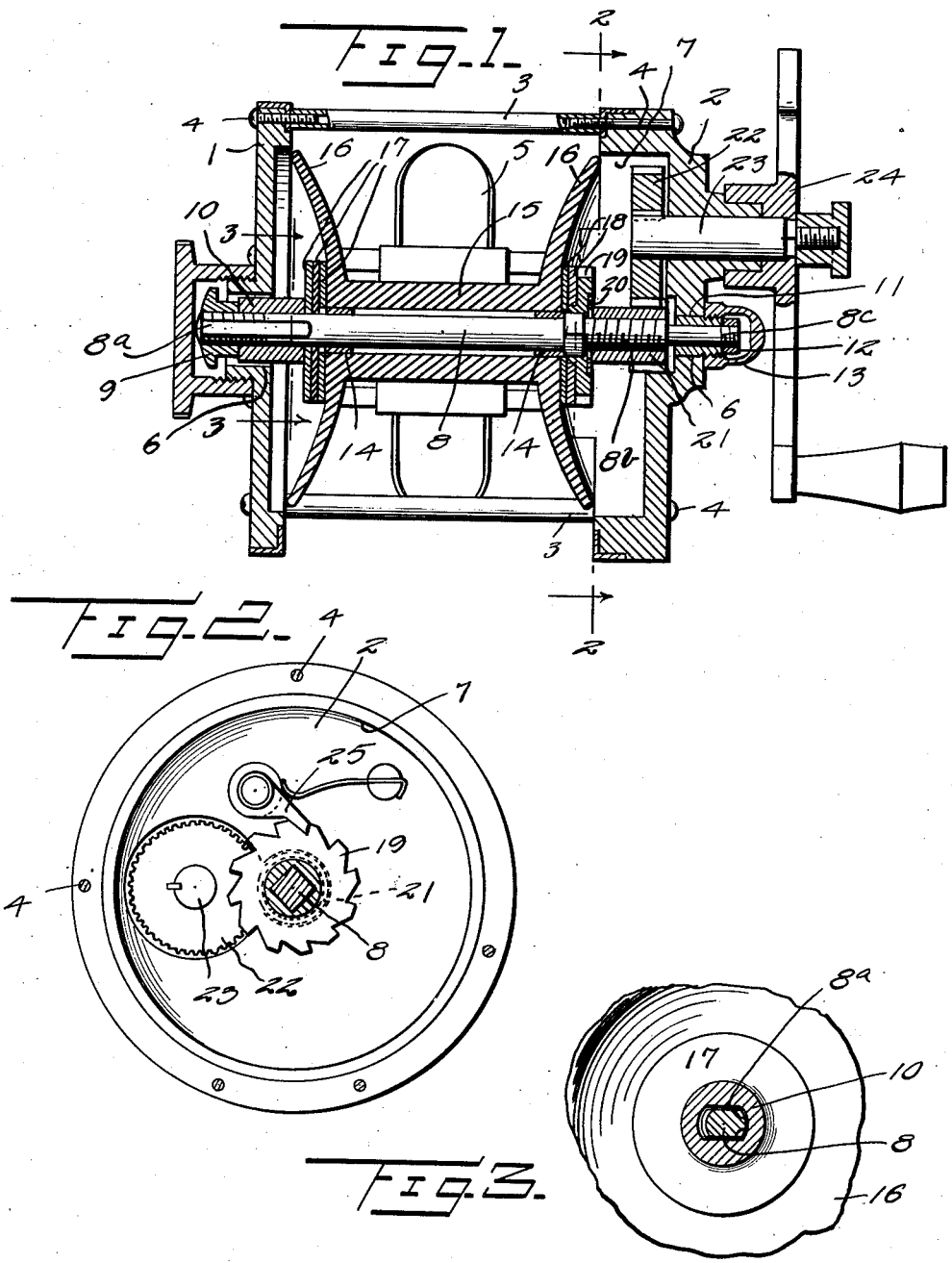

Patented Sept. 12, 1939

2,172,824

UNITED STATES PATENT OFFICE 2,172,824

FISHING REEL

John A. White, Harlingen, Tex., assignor to John R. Fitzgerald, Harlingen, Tex.

Application March 20, 1939, Serial No. 263,034

2 Claims. (Cl. 242—84.5)

My invention relates to fishing reels and is an improvement over the form illustrated and described in United States Letters Patent No. 2,150,088 granted unto me the 7th day of March, 1939.

One of the principal objects of my invention is to provide a fishing reel equipped with means to effect a drag on the line reel together with means for varying and releasing said drag as desired.

Another object of my invention is to provide a fishing reel of the above described character which is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is a horizontal sectional view of my invention.

Figures 2 and 3 are detail sectional views taken on the lines 2—2 and 3—3 of Figure 1 respectively.

In practicing my invention I provide a pair of spaced end plates 1 and 2 which are detachably connected in spaced relation by tie rods 3 in which are threaded bolts 4 after passing through said end plates. Certain of the tie rods have formed thereon a mounting plate 5 of a conventional construction and used for cooperation with reel clamps on a fishing pole (not shown) to removably secure the reel on the pole. The end plates 1 and 2 have aligned openings 6 and the end plate 2 has formed in the inner face thereof a gear chamber 7.

A reel shaft 8 extends through the openings of the end plates and the end thereof, adjacent the end plate 1, is fashioned with oppositely disposed flat faces 8a and is threaded to receive thereon a lock nut 9, the inner face of which engages the outer face of a sleeve 10 slidably mounted on the shaft. The bore of said sleeve is fashioned with faces corresponding to the faces 8a whereby said sleeve may be adjusted in an axial direction relative to the shaft through the medium of the lock nut 9 and rotatably operated with said shaft.

Within the gear chamber 7, the opposite end of the shaft 8 is provided with a left-hand threaded section 8b having extending outwardly therefrom a reduced portion 8c journaled in a bushing 11 secured in the end plate 2. The outer end of the portion 8c is provided with a nut 12 to prevent axial displacement of the shaft in a direction towards the end plate 1.

The outer end of the bushing 11 has secured thereover a cover cap 13 which also covers the outer end of the portion 8c.

Rotatably mounted on bushings 14 carried on the shaft 8 is a reel drum 15 fashioned with outwardly curved flanges 16 to permit a fishing line, connected to said drum, to readily wind on and off of the latter. Located on the shaft 8 and interposed between the inner face of the sleeve 10 and the adjacent flange 16 of the reel drum are three brake disks 17, the outer ones of which are constructed of metal and the middle one of fiber whereby adjustment of the lock nut 9 on the end of the shaft 8 serves to effect frictional engagement between the disks, inner face of the sleeve and outer face of the adjacent flange 16 whereby to retard or effect drag on the drum when rotated. The opposite end of the shaft is likewise provided with a pair of brake discs 18 coacting with the flange to effect said drag.

Adjacent the disks 18 I provide a ratchet wheel 19 fixed on the shaft 8 for rotation therewith. Said ratchet wheel is fashioned with a hub having an extended section interposed between the outer disk 18 and said shaft. The outer face of the ratchet wheel 19 is recessed and receives therein a washer 20 and said wheel is keyed to the shaft by means of non-circular portions formed thereon.

Threadedly mounted on the threaded section 8b of the shaft is a pinion 21 meshing with a gear 22 keyed to the inner end of a shaft 23 journaled in the end plate 2. The outer end of said shaft 23 has secured thereto an operating handle 24 whereby to rotate the gear 22. Rotation of the gear 22 in one direction serves to move the pinion 21 through the medium of the threaded section 8b into engagement with the outer face of the washer 20 to apply additional drag on the drum 15 and reverse movement of the handle serves to move the pinion 21 in the opposite direction to relieve the drum 15 of the additional drag. Obviously, by adjusting the pinion 21 relative to the ratchet wheel 19 a desired amount of additional drag may be had on the drum 15.

It is to be understood that the drag effected on the drum 15 through the medium of the nut 9 is of a more or less permanent adjustment while the drag effect through the medium of the operation of the pinion 21 is of a temporary adjustment to meet a particular reel line operating condition. It is to be further understood that when the pinion 21 has been operated in the direction towards the ratchet wheel 19, continued rotation of the handle serves to effect winding of the line upon the drum through the medium of a spring pressed dog 25 ratcheting over the teeth of the ratchet wheel 19 and pivoted to the end plate 2 within the chamber 7 as clearly illustrated in Figure 2. Obviously, rotation of the reel in the opposite direction causes the dog 25 to engage the teeth of the wheel 19 and preclude rotation of the shaft.

What I claim is:

1. A fishing reel comprising end plates having aligned shaft openings, connecting means joining said end plates, a reel shaft loosely received in said shaft openings, means journaling said reel shaft in one of said openings, a sleeve mounted on said reel shaft and journaling the latter in the other of said openings, said sleeve being adjustable axially of said reel shaft and rotatable therewith, a nut threaded on said reel shaft for effecting axial adjustment of said sleeve, spaced groups of clutch plates carried by said reel shaft for rotation therewith and one plate of one group abutted by said sleeve, a ratchet gear slidably mounted on said reel shaft and abutting a clutch plate of said other group, a reel drum rotatably mounted on said reel shaft between said groups of clutch plates and rotatable with said reel shaft upon adjustment of said nut to effect clutching engagement of said plates with said drum, a pinion threadedly mounted on said reel shaft and operable into engagement with said ratchet gear to effect drag on a line connected to said drum, manual control means mounted on one of said end plates adjacent said pinion and connected to the latter whereby to effect engagement and disengagement of said pinion with said ratchet gear, and a spring pressed dog pivoted on said last mentioned end plate and engaging said ratchet gear for permitting rotation of said reel shaft in one direction and precluding rotation of said reel shaft in the other direction.

2. A fishing reel comprising end plates having aligned shaft openings, connecting means joining said end plates, a reel shaft loosely received in said shaft openings, means journaling said reel shaft in one of said openings, a sleeve mounted on said reel shaft and journaling the latter in the other of said openings, said sleeve being adjustable axially of said reel shaft and rotatable therewith, a nut threaded on said reel shaft for effecting axial adjustment of said sleeve, spaced groups of clutch plates carried by said reel shaft for rotation therewith and one plate of one group abutted by said sleeve, a ratchet gear slidably mounted on said reel shaft and abutting a clutch plate of said other group, a reel drum rotatably mounted on said reel shaft between said groups of clutch plates and rotatable with said reel shaft upon adjustment of said nut to effect clutching engagement of said plates with said drum, a pinion threadedly mounted on said reel shaft and operable into engagement with said ratchet gear to effect drag on a line connected to said drum, a second shaft journaled in one of said end plates adjacent said pinion, a gear fixed on said second shaft and meshing with said pinion, a handle connected to said second shaft for operating said gear whereby to effect engagement and disengagement of said pinion with said ratchet gear, and a spring pressed dog pivoted on said last mentioned end plate and engaging said ratchet gear for precluding rotation of said reel shaft in one direction and permitting rotation of said reel shaft in the other direction.

JOHN A. WHITE.